US012373102B2

(12) United States Patent
Huang et al.

(10) Patent No.: US 12,373,102 B2
(45) Date of Patent: Jul. 29, 2025

(54) STORAGE DEVICE I/O PERFORMANCE IN REMOTE COMPUTING ENVIRONMENTS

(71) Applicant: Omnissa, LLC, Mountain View, CA (US)

(72) Inventors: Weigang Huang, Beijing (CN); Yueting Zhang, Beijing (CN); Huiyong Huo, Beijing (CN); Zhongzheng Tu, Beijing (CN); Mingsheng Zang, Beijing (CN); Chuansheng Zhang, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 17/644,747

(22) Filed: Dec. 16, 2021

(65) Prior Publication Data

US 2023/0195313 A1     Jun. 22, 2023

(51) Int. Cl.
*G06F 12/00*     (2006.01)
*G06F 3/06*     (2006.01)

(52) U.S. Cl.
CPC .......... *G06F 3/0611* (2013.01); *G06F 3/0655* (2013.01); *G06F 3/0679* (2013.01)

(58) Field of Classification Search
CPC ..... G06F 3/0611; G06F 3/0655; G06F 3/0679
See application file for complete search history.

(56) References Cited

U.S. PATENT DOCUMENTS

| | | | | |
|---|---|---|---|---|
| 6,973,512 | B1* | 12/2005 | Koeman | G06F 13/102 |
| | | | | 710/36 |
| 7,082,598 | B1* | 7/2006 | Le | G06F 9/4413 |
| | | | | 703/21 |
| 7,478,180 | B1* | 1/2009 | Li | G06F 13/105 |
| | | | | 710/52 |
| 8,010,630 | B2* | 8/2011 | Barreto | H04L 67/59 |
| | | | | 709/219 |
| 8,200,864 | B1* | 6/2012 | Lachwani | G06F 13/102 |
| | | | | 710/305 |
| 9,397,944 | B1* | 7/2016 | Hobbs | H04L 47/522 |
| 9,582,444 | B1* | 2/2017 | Kumar | G06F 3/0665 |
| 9,971,529 | B1* | 5/2018 | LeCrone | G06F 3/067 |
| 2010/0161863 | A1* | 6/2010 | Cota-Robles | G06F 11/3476 |
| | | | | 710/262 |

(Continued)

*Primary Examiner* — Daniel D Tsui
(74) *Attorney, Agent, or Firm* — Kim & Stewart LLP

(57) ABSTRACT

The disclosure provides techniques for storage device input/output (I/O) performance improvement in a remote computing environment. Embodiments include creating, on a remote device that is remote from a client device, a virtual storage device corresponding to a physical storage device that is located on the client device. Embodiments include receiving, by a driver on the remote device, a request from an application on the remote device to perform an input or output operation with respect to the virtual storage device. Embodiments include sending, by the remote device, a block-level input or output operation to the client device based on the request. Embodiments include receiving, by the remote device, a result of the block-level input or output operation from the client device. Embodiments include providing, by the driver on the remote device, to the application, a response to the request based on the result of the block-level input or output operation.

20 Claims, 5 Drawing Sheets

(56) References Cited

U.S. PATENT DOCUMENTS

| | | | | |
|---|---|---|---|---|
| 2010/0185803 A1* | 7/2010 | Gjoerup | ............... | G06F 3/0661 |
| | | | | 711/E12.008 |
| 2011/0047195 A1* | 2/2011 | Le | ..................... | G06F 16/188 |
| | | | | 707/827 |
| 2011/0265083 A1* | 10/2011 | Davis | ................ | G06F 12/0866 |
| | | | | 718/1 |
| 2013/0326095 A1* | 12/2013 | Edney | .................. | H04W 72/51 |
| | | | | 710/38 |
| 2013/0326186 A1* | 12/2013 | Shaikh | ................... | G06F 16/22 |
| | | | | 711/170 |
| 2014/0006731 A1* | 1/2014 | Uluski | ................ | G06F 3/0604 |
| | | | | 711/155 |
| 2014/0164648 A1* | 6/2014 | Barber | ............... | G06F 13/387 |
| | | | | 710/8 |
| 2015/0220467 A1* | 8/2015 | Jin | .................... | G06F 9/45533 |
| | | | | 710/18 |
| 2016/0179565 A1* | 6/2016 | Chen | ..................... | H04L 67/08 |
| | | | | 718/1 |
| 2017/0180516 A1* | 6/2017 | Chauhan | ............ | G06F 13/4282 |
| 2017/0212690 A1* | 7/2017 | Babu | ..................... | G06F 3/0685 |
| 2017/0289262 A1* | 10/2017 | Vajravel | ............. | H04L 43/0829 |
| 2018/0232293 A1* | 8/2018 | Petrick | ............... | G06F 11/3027 |
| 2019/0050350 A1* | 2/2019 | Regupathy | .......... | G06F 9/45558 |
| 2020/0252472 A1* | 8/2020 | Vajravel | ................ | H04L 67/01 |
| 2022/0066812 A1* | 3/2022 | Du | ...................... | H04L 67/5651 |
| 2022/0066821 A1* | 3/2022 | Pinto | .................... | G06F 9/5005 |

\* cited by examiner

STORAGE DEVICE I/O PERFORMANCE IN REMOTE COMPUTING ENVIRONMENTS

BACKGROUND

In a virtual desktop infrastructure (VDI) environment, a local client device can access and display a remote virtual or physical desktop or remote application that is running on a remote device. For instance, a virtual desktop may be hosted on a central infrastructure known as a VDI, and may be rendered on a client device using a remote display protocol. At the client device, a user may interact with the virtual desktop using peripheral devices (e.g., keyboard and mouse, pen, etc.) associated with the client device, and operating system (OS) events generated based on the user's inputs may be redirected from the client device to the remote device on which the virtual desktop is actually running.

In some cases, a storage device associated with the client device (e.g., connected to a universal serial bus (USB) interface on the client device) may be used to store data. In certain aspects, the virtual desktop or remote application on the remote device may access such data stored at a storage device at the client device. Storage input/output (I/O) requests made by the virtual desktop or remote application may be converted into USB request block (URB) requests on the remote device and sent to the client device in order to retrieve data stored on the storage device or converted into URBs on the remote device and sent to the client device in order to write date to the storage device. The client device may send requested data back to the remote device as URBs. Furthermore, the remote device will respond to each URB received from the client device with a confirmation message.

The network traffic required to transmit these URB requests and URBs between the remote device and the client device may be substantial, and may result in latency and poor performance. For example, the maximum transferring unit for USB I/O is 64 kilobytes (KB), meaning that any storage I/O operation must be broken up into a separate URB request or URB for each 64 KB of data included in the storage I/O request, which may result in a significant amount of network traffic. Any network connection issues (e.g., if the network connection is throttled or otherwise operates at a reduced speed) may result in further decreased performance. Such poor storage I/O performance may significantly reduce the ability of a virtual desktop or other remotely-located application to function as intended.

Accordingly, there is a need in the art for improved techniques for handling storage I/O between a virtual desktop or remote application on a remote device and a storage device associated with a client device.

SUMMARY

A method of storage device input/output (I/O) performance improvement in a remote computing environment is provided. The method includes: creating, on a remote device that is remote from a client device, a virtual storage device corresponding to a physical storage device that is located on the client device; receiving, by a driver on the remote device, a request from an application on the remote device to perform an input or output operation with respect to the virtual storage device; sending, by the remote device, a block-level input or output operation to the client device based on the request; receiving, by the remote device, a result of the block-level input or output operation from the client device; and providing, by the driver on the remote device, to the application, a response to the request based on the result of the block-level input or output operation.

Further embodiments include a non-transitory computer-readable storage medium storing instructions that, when executed by a computer system, cause the computer system to perform the method set forth above. Further embodiments include a computing system comprising at least one memory and at least one processor configured to perform the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
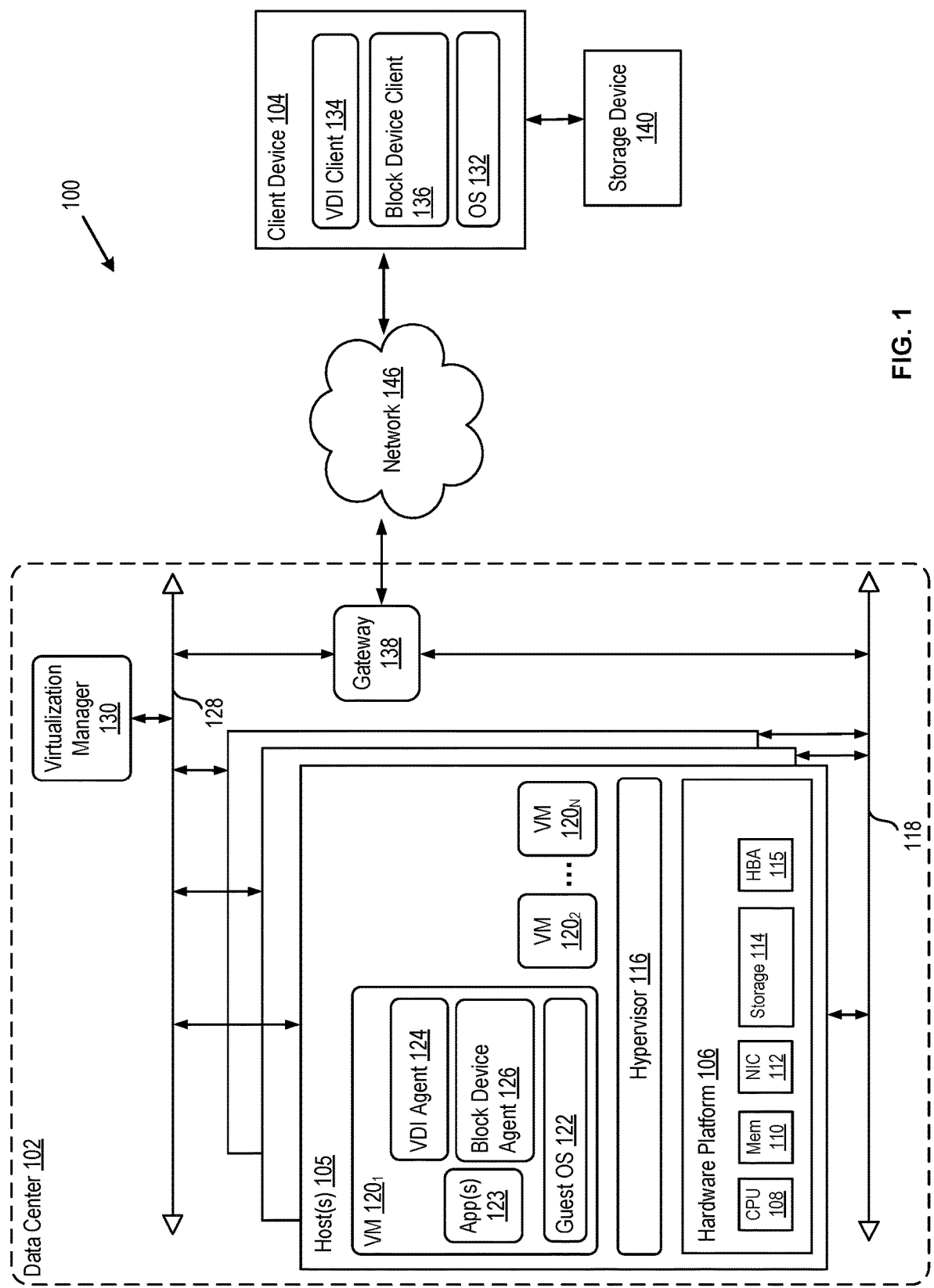
FIG. 1 depicts a block diagram of a virtualized desktop infrastructure system in which one or more embodiments according to the present disclosure may be implemented.

The present disclosure provides an approach for performance improvement in a remote computing environment. In some cases, a physical storage device connected to a client device may store data accessed by an application (e.g., virtual desktop or other application) located on a remote device. As such, storage I/O operations performed by the application on the remote device with respect to the physical storage device must be redirected to the client device in order to read data from or write data to the physical storage device. Certain techniques for device redirection, such as operating system (OS) event redirection, in a VDI environment are described in more detail in U.S. patent application Ser. No. 16/444,840, the contents of which are incorporated by reference herein in their entirety.

However, conventional techniques for handling storage I/O in remote computing environments may involve the transmission of a substantial number of separate packets over a network between the client machine and the remote machine, such as URB requests and URBs, including URB headers and individual chunks of requested data (e.g., each being capped at 64 KB), sent in response to the URB requests. In some cases, each URB that is received is also responded to over the network with an acknowledgment. As described in more detail below with respect to FIG. 2, transmitting storage I/O requests at the USB level involves translating a storage I/O request from an application through several levels, including a volume level, a disk level, and a small computer systems interface (SCSI) level, to the USB level before transmitting requests over the network. This translation process often involves breaking up an individual storage I/O request into a potentially large number of smaller requests, each of which is separately transmitted over the network and receives a separate response over the network, in some cases followed by an acknowledgment of the response.

This substantial amount of network traffic may result in poor storage I/O performance, particularly in cases where a network connection is experiencing high amounts of latency. Accordingly, as described in more detail below with respect to FIG. 3, techniques described herein involve transmitting storage I/O requests over the network at the volume level (e.g., block level) rather than at another level such as the USB level, thereby skipping the unnecessary overhead and greatly reducing the number of packets sent between the client device and the remote device.

In an example, a physical storage device is connected to a USB interface of a client device. A user accesses a remote application, such as a virtual desktop located on a remote device, via a client application on the client device (e.g., involving communication between a VDI client and a VDI agent), and data related to the remote application is written to or read from the physical storage device connected to the client device. According to certain embodiments, rather than using conventional USB redirection techniques, a virtual storage device corresponding to the physical storage device is created on the remote machine. A virtual storage device is a virtual representation of a physical device that mimics the behavior of the physical device by receiving and responding to requests (e.g., storage I/O requests) from applications, such as based on data received from the physical device that it represents.

In certain embodiments, a driver (referred to as a block device driver) is installed in a kernel of the guest operating system (OS) of a virtual computing instance (VCI) on the remote machine, and the block device driver creates a virtual storage device within the guest OS. In some cases, if the physical storage device comprises multiple partitions, the block device driver may create a virtual storage device for each partition. The block device driver maintains a mapping between the one or more virtual storage devices and the corresponding physical storage device associated with the client device. Applications on the remote device may submit storage I/O requests to a virtual storage device as if these requests were being submitted to a physical storage device, and these I/O requests may be redirected at the volume level (e.g., without first being translated through the disk, SCSI, or USB levels) to the client device.

In an example embodiment, the block device driver communicates with a block device agent on the remote device, which in turn communicates with a block device client on the client device (e.g., via a virtual channel) in order to redirect block-level I/O requests and responses to the client device. For example, a virtual channel between the remote device and the client device may be established via the block device agent and the block device client. A virtual channel is a logical communication resource between two endpoints that is allocated particular communication resources from one or more physical network interfaces associated with the two endpoints, and allows for communication between the two endpoints. The block device client initiates block-level I/O to real volume objects of the physical storage device based on the I/O requests received from the block device agent, obtains actual results from the physical storage device, and responds to the block device agent accordingly (e.g., with requested data at the block level or with an acknowledgment that a block-level write operation was successfully completed). The block device agent responds to the block device driver based on the response received from the block device client, and the block device driver in turn responds to the application accordingly (e.g., with results of the I/O operation requested by the application).

Block-level storage I/O redirection may result in a significant reduction of the number of packets sent between the remote device and the client device as compared to USB-level redirection, as each block-level I/O request/response does not need to be broken up into smaller (e.g., 64 KB) URB requests/responses before transmission over the network. Additionally, block-level I/O requests and responses may be sent between the remote machine and the client machine without URB headers. Furthermore, block-level storage I/O redirection avoids the network traffic of the three-stage process associated with each individual URB request (e.g., sending a request, receiving a response, and then sending an acknowledgment of the response). Accordingly, techniques described herein improve storage I/O performance in remote computing environments, particularly in cases where network latency is high and/or root permission is not available on the remote machine.

It is noted that while certain examples described herein involve USB devices and URBs, techniques described herein may be employed for other types of storage devices.

FIG. 1 depicts a block diagram of a virtualized desktop infrastructure (VDI) system 100 in which one or more embodiments according to the present disclosure may be implemented. VDI system 100 comprises at least one client device 104 and a data center 102, connected by a network 146. Network 146 may be, for example, a direct link, a local area network (LAN), a wide area network (WAN) such as the Internet, another type of network, or a combination of these.

Client device 104 is a physical device, such as a general purpose desktop computer or mobile computer. A mobile computer may be, for example, a laptop, a mobile phone, or a tablet computer. Client device 104 includes VDI client 134, OS 132, and block device client 136. In certain embodiments, VDI client 134 and block device client 136 run on top of OS 132. OS 132 may be a standard, commodity operating system.

VDI client 134 is a user-side interface of a virtualized desktop running on one of virtual machines (VMs) 120. Though certain aspects are described herein with respect to a virtual desktop running on a VM, the techniques may similarly be used for a virtual desktop or application running on other types of VCIs, such as containers, or on physical computing devices. As used herein, a "virtualized desktop" or "remote desktop" is a desktop running on, for example, one of VMs 120 that is displayed remotely on client device 104, as though the remote desktop were running on client device 104. By opening VDI client 134, a user of client device 104 accesses, through network 146, a remote desktop running in remote data center 102, from any location, using client device 104. Frames of the remote desktop running on VM 120 are transmitted to VDI client 134 using a desktop delivery protocol such as VMware® Blast™, or Microsoft® Remote Desktop Protocol (RDP)™.

After transmission, the frames are displayed on client device 104 for interaction by the user. Client device 104 sends user inputs to VM 120 for processing on VM 120 of data center 102, taking processing load off client device 104. Such centralized and automated management of remote desktops provides increased control and cost savings. VDI client 134 may be, for example, VMware® View™, or a special purpose thin client such as those available from Dell, HP, NEC, Sun Microsystems, Wyse, and others.

As the user interacts with the virtual desktop, such as using a mouse and keyboard and/or other peripheral devices, the user input events may be redirected by VDI client 134 to VDI agent 124. A storage device 140 is connected to client device 104 (e.g., to a USB interface of client device 104), and stores data accessible by VM 120, such as by the virtual desktop and/or one or more applications 123.

Block device client 136 generally performs operations related to block-level storage I/O redirection, which may involve communication with block device agent 126 over network 146. For example, a virtual channel may be established between block device client 136 and block device agent 126. In some cases, communication between block device client 136 and block device agent 126 is facilitated by VDI client 134 and VDI agent 124. In one embodiment, block device client 136 is a plugin installed in client device 104, such as within VDI client 134 or is a separate application from VDI client 134. As described in more detail below with respect to FIG. 4, block device client 136 may send a message to block device agent 126 to initiate creation of a virtual storage device on VM 120 corresponding to storage device 140. Subsequently, block device client 136 may receive block-level I/O requests from block device agent 126, and may send corresponding I/O requests to storage device 140. Block device client 136 may send results of the I/O operations to block device agent 126.

It is noted that while block device client 136 is depicted separately from VDI client 134, block device client 136 may alternatively be included within VDI client 134.

Data center 102 includes host(s) 105, a virtualization manager 130, a gateway 138, a management network 128, and a data network 118. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. One example of a hypervisor 116 that may be used is a VMware ESXi™ hypervisor provided as part of the VMware vSphere® solution made commercially available from VMware, Inc. of Palo Alto, California.

Each VM 120 includes a guest OS 122, one or more applications 123, a VDI agent 124, and block device agent 126. Application(s) 123, VDI agent 124, and block device agent 126 run on top of guest OS 122. Guest OS 122 may be a standard, commodity operating system. An application 123 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 123 open on the remote desktop, which application(s) 123 are running on and/or displayed on the remote desktop of VM 120, and other information.

Block device agent 126 interacts with block device client 136 for block-level I/O redirection. In one embodiment, block device agent 126 is a plugin installed in VM $120_1$, such as within VDI agent 124, or is a separate application from VDI agent 124. In certain embodiments, block device agent 126 may receive an indication from block device client 136 to initiate creation of a virtual storage device corresponding to storage device 140, and interacts with a block device driver in a kernel of guest OS 122 to initiate creation of the virtual storage device. The virtual storage device may be created within guest OS 122 such that applications may direct storage I/O requests to the virtual storage device, and the block device driver may cause these requests to be redirected to client device 104. The block device driver may receive results of performing the requested I/O operations on storage device 140 (e.g., from block device client 136 via block device agent 126), and respond to the requests from the applications with these results.

It is noted that while block device agent 126 is depicted separately from VDI agent 124, block device agent 126 may alternatively be included within VDI agent 124.

Hardware platform 106 of each host 105 includes components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 118 or network 128. Network interface 112 may include one or more network adapters, also referred to as Network Interface Cards (NICs). Storage system 114 represents persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 128, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Gateway 138 provides VMs 120 and other components in data center 102 with connectivity to network 146. Gateway 138 may manage external public IP addresses for VMs 120, route traffic incoming to and outgoing from data center 102, and provide networking services, such as firewalls, network address translation (NAT), dynamic host configuration protocol (DHCP), and load balancing. Gateway 138 uses data network 118 to transmit data network packets to hosts 105. Gateway 138 may be a virtual computing instance, a physical device, or a software module running within host 105. Gateway 138 may include two gateways: a management gateway for management network 128 and a data gateway for data network 118.

Figure 2:
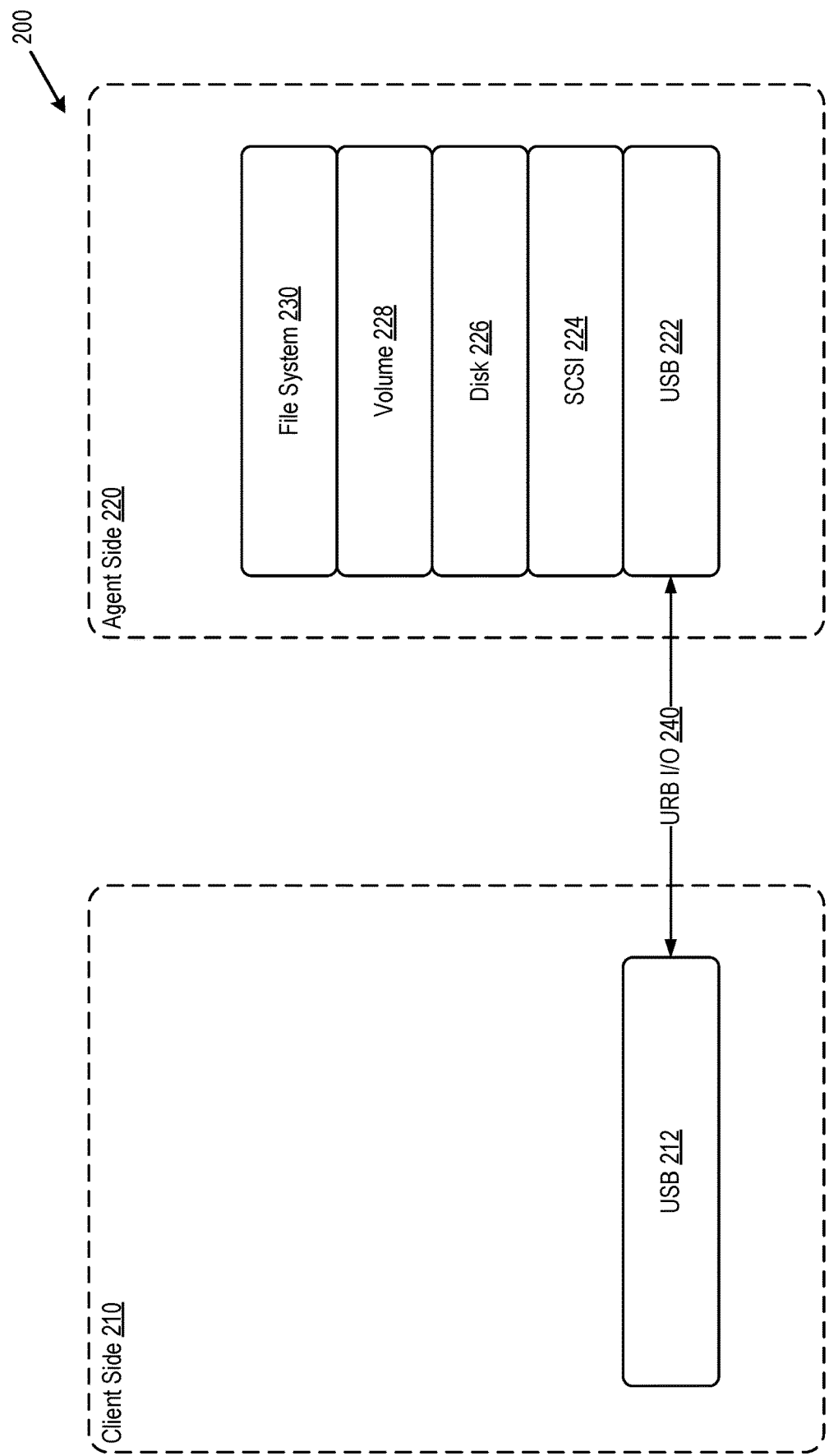
FIG. 2 is an illustration of a prior art technique for handling storage I/O between a client device and a remote device.

FIG. 2 is an illustration 200 of a prior art technique for handling storage I/O between a client device and a remote device. Illustration 200 includes a client side 210, which may be representative of a client device similar to client device 104 of FIG. 1, and an agent side 220, which may be representative of a remote device such as a host 105 or VM 120 of FIG. 1.

In illustration 200, storage I/O requests, such as from an application, are redirected from agent side 220 to client side 210 at the USB level 222, which is the lowest level of a "stack" that includes multiple levels 222, 224, 226, 228, and 230. The stack is an abstract data structure that is defined by various hardware, firmware, kernel modules, drivers, and/or other applications that allow communication over USB links, and each level of the stack involves conversion and/or encapsulation. For example, a storage I/O request is received at the file system level 230 from an application, as the storage I/O request may be directed to one or more files in the file system. The storage I/O request is converted to a block-level request for processing at the volume level 228, as files in a storage volume are generally made up of logical "blocks" of data.

The block-level request is then converted to a disk-level request for processing at the disk level 226, such as by referencing particular locations on a physical disk. Subsequently, the disk-level request is then converted to a SCSI request for processing at the SCSI level 224, such as by converting the request into one that conforms to SCSI protocols. Finally, the SCSI request is converted to a USB request for processing at the USB level 222, such as by converting the request into a URB request (e.g., including encapsulating the request with a URB header).

URB I/O traffic 240 is exchanged at the USB level between agent side 220 and client side 210. For example a URB request may be sent from agent side 220 at the USB level 222 to client side 210 at the USB level 212. Client side 210 may respond to the URB request by sending a URB (e.g., based on a result of performing the requested operation on a physical storage device) to agent side 220.

As discussed above, URBs are size-limited (e.g., to 64 KB per URB), such that each storage I/O request from an application may need to be broken up into a potentially large number of smaller URBs, each of which may require separate network transmission of a request, a response, and an acknowledgment in the context of a remote computing environment. As such, redirecting storage I/O requests at the USB level may result in poor performance, particularly in cases where a network is slow or otherwise experiencing a high level of latency.

As such, embodiments of the present disclosure involve redirecting storage I/O requests at the block level, as described in more detail below with respect to FIG. 3.

Figure 3:
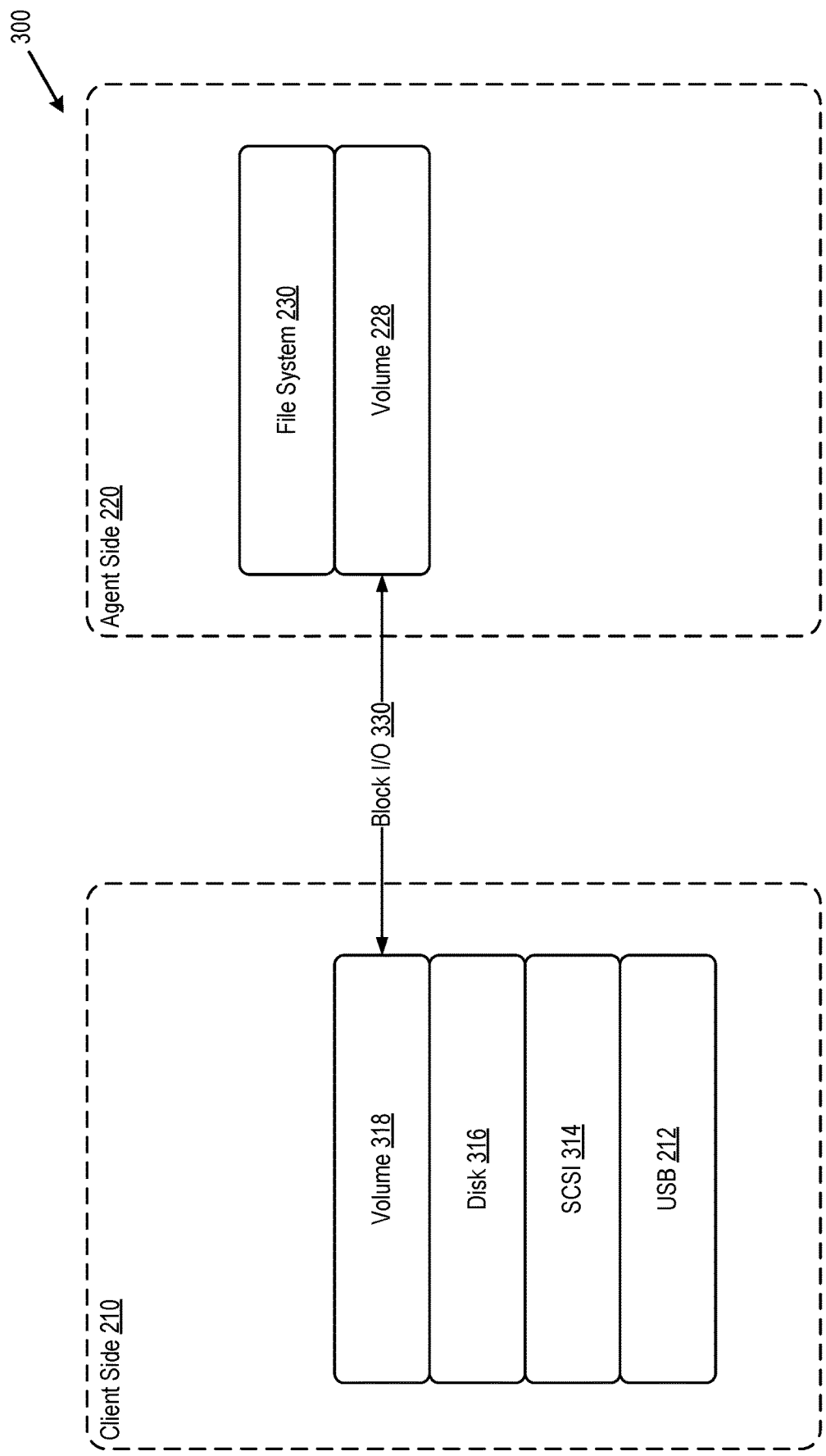
FIG. 3 is an illustration of an improved technique for handling storage I/O between a client device and a remote device, according to embodiments of the present disclosure.

FIG. 3 is an illustration 300 of an improved technique for handling storage I/O between a client device and a remote device, according to embodiments of the present disclosure. The issues described above with respect to FIG. 2 are addressed by techniques described herein, such as with respect to FIG. 3.

Illustration 300 includes client side 210 and agent side 220 of FIG. 2. However, rather than redirecting storage I/O requests at the USB level, as in FIG. 2, illustration 300 depicts redirecting storage I/O requests at the block level.

On the agent side, a storage I/O request received at the file system level 230 is converted to a block-level request for processing at the volume level 228. Block I/O traffic 330 is exchanged between agent side 220 at the volume level 228 and client side 210 at the volume level 318. For example, a block level storage I/O request may be sent from agent side 220 to client side 210, and the block-level storage I/O request may be converted on client side 210 through the disk level 316 and SCSI level 314 to the USB level 212 in order to perform the requested storage I/O operation on the physical storage device. Results of performing the requested I/O operation are converted back through the SCSI level 314 and disk level 316 to the volume level 318 on client side 210 and then transmitted to agent side 220 as a block-level response to the block-level storage I/O request. For instance, the response may include data requested from the physical storage device or a confirmation that data was successfully written to the physical storage device. The response is converted through the file system level 230 on agent side 220 and used to respond to the application that originally submitted the storage I/O request.

Block-level storage I/O requests are not subject to the same restrictions as URBs, such as strict size limits, and so a single block-level storage I/O request may be used to request an operation relating to a significantly larger amount of data than a URB. For example, block-level storage I/O may have a granularity of 1024 KB rather than 64 KB, and so a significantly smaller number of packets may need to be transmitted over the network when block-level requests are used rather than URB requests, thereby significantly improving the performance of the storage I/O process.

Figure 4:
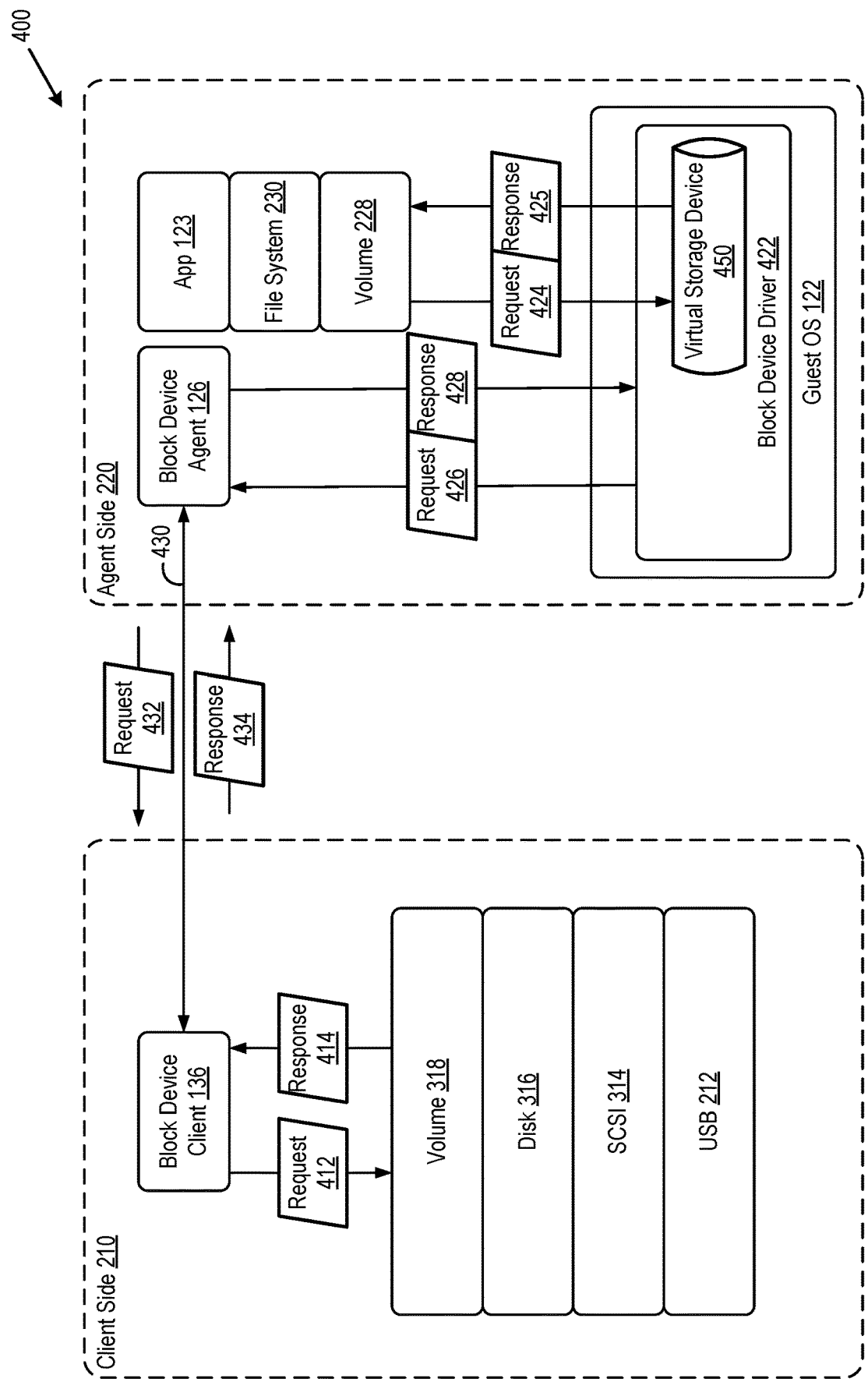
FIG. 4 is an illustration of storage I/O performance improvement in a remote computing environment.

FIG. 4 is an illustration 400 of storage I/O performance improvement in a remote computing environment. Illustration 400 includes client side 210, agent side 220, file system level 230, volume level 228, volume level 318, disk level 316, SCSI level 314, and USB level 212 of FIGS. 2 and 3, as well as block device client 136, block device agent 126, an application 123, and guest OS 122 of FIG. 1.

On agent side 220, a block device driver 422 is installed in guest OS 122, such as in a kernel. Block device driver 422 creates a virtual storage device 450 corresponding to a physical storage device associated with client side 210 (e.g., storage device 140 of FIG. 1), such as based on information relating to the physical storage device sent from block device client 136 to block device agent 126, and then from block device agent 126 to block device driver 422. Virtual storage device 450 may emulate aspects of the physical storage device, such as allowing applications to direct storage I/O requests to the virtual storage device and then responding to these storage I/O requests with results of actually performing the requested I/O operations on the physical storage device. In some embodiments, if the physical storage device comprises multiple partitions, a separate virtual storage device may be created for each partition. Block device driver 422 may assign a drive letter to virtual storage device 450 (e.g., X), and applications may direct storage I/O requests that drive letter.

In an example, an application 123 on agent side 220 directs a storage I/O request to virtual storage device 450, such as a file-system-level request to read data from or write data to virtual storage device 450. The request is received at file system level 230, and converted to a block-level request for processing at volume level 228. The block-level request, represented by request 424 is sent by block device driver 422 as a block-level request 426 to block device agent 126. Block device agent 126 sends the received block-level request as block-level request 432 to block device client 136 via virtual channel 430, such as over network 146 of FIG. 1.

Block device client 136 receives the block-level request, and initiates performing the requested storage I/O operation, represented by request 412, on the physical storage device. The block-level request is converted on client side 210 from volume level 318 through disk level 316, and SCSI level 314 to USB level 212 in order to perform the requested I/O operation on the physical storage device. Results of performing the requested I/O operation are converted back through the SCSI level 314 and disk level 316 to the volume level 318 on client side 210, received by block device client 136 as response 414, and then transmitted by block device client 136 as a block-level response 434 to block device agent 126 via virtual channel 430. For instance, the response may include data requested from the physical storage device or a confirmation that data was successfully written to the physical storage device. The response is sent by block device agent 126 as a response 428 to block device driver 422, and then as part of response 425, it is converted from the volume level 228 through the file system level 230 on agent side 220 and used to respond to application 123.

Experimental results indicate that, even in a network with normal conditions (e.g., no excessive latency), block-level storage I/O redirection in remote computing environments as described herein is at least twice as fast as USB-level storage I/O redirection and, in some cases (e.g., when copying a single file), four times as fast. It is to be expected that performance gains would be even higher in networking environments with sub-optimal conditions, such as networks experiencing high amounts of latency, due to the significant reduction in network traffic achieved by techniques described herein.

In some embodiments block-level requests and/or responses may be batched for transmission between client side 210 and agent side 220, such as based on time intervals or other conditions (e.g., being related to a common underlying storage I/O request, reaching threshold amounts of data, and/or the like). For instance, if a single storage I/O request from an application must be broken into multiple block-level requests, these block-level requests may be batched for transmission from agent side 220 to client side 210 together in a single message and the responses to the block-level requests may also be batched for transmission from client side 210 to agent side 220. Thus, batching may further reduce the amount of network traffic between client side 210 and agent side 220, and thereby further improve the performance of the system.

Figure 5:
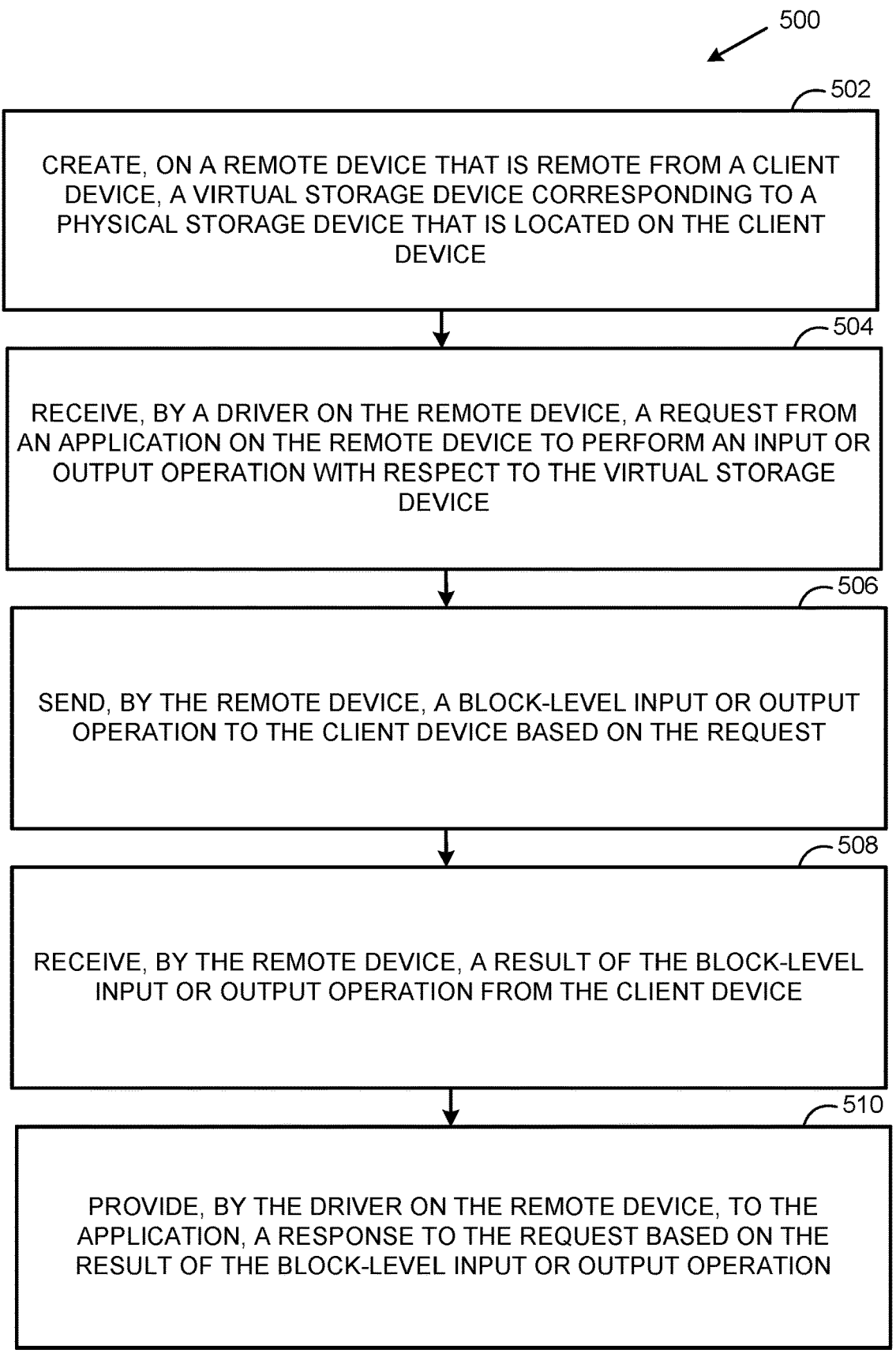
FIG. 5 depicts example operations related to performance improvement in a remote computing environment.

FIG. 5 illustrates example operations 500 related to performance improvement in a remote computing environment. For example, operations 500 may be performed by one or more components of client device 104 and/or host 105 of FIG. 1.

Operations 500 begin at step 502, with creating, on a remote device that is remote from a client device, a virtual storage device corresponding to a physical storage device that is located on the client device. In some embodiments, the virtual storage device is created based on receiving, by the remote device, a request from the client device to initiate creation of the virtual storage device based on the physical storage device. In some cases, the physical storage device is a universal serial bus (USB) device connected to the client device.

Certain embodiments further comprise creating, on the remote device, an additional virtual volume, wherein the virtual volume corresponds to a first partition of the physical storage device and the additional virtual volume corresponds to a second partition of the physical storage device.

Operations 500 continue at step 504, with receiving, by a driver on the remote device, a request from an application on the remote device to perform an input or output operation with respect to the virtual storage device.

Operations 500 continue at step 506, with sending, by the remote device, a block-level input or output operation to the client device based on the request. In some embodiments, the block-level input or output operation is converted to a USB request block (URB) request on the client device.

Operations 500 continue at step 508, with receiving, by the remote device, a result of the block-level input or output operation from the client device. In certain embodiments, the result of the block-level input or output operation comprises data retrieved from the physical storage device based on the block-level input or output operation, and wherein the data is transmitted from the client device to the remote device in a single transmission.

Operations 500 continue at step 510, with providing, by the driver on the remote device, to the application, a response to the request based on the result of the block-level input or output operation.

Some embodiments further comprise creating a virtual channel between the remote device and the client device, wherein the block-level input or output operation and the result of the block-level input or output operation are transmitted via the virtual channel.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments according to the present disclosure may be useful machine operations. In addition, one or more embodiments according to the present disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments according to the present disclosure may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments according to the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of storage device input/output (I/O) performance improvement in a remote computing environment, the method comprising:

creating, on a remote device that is remote from a client device, a virtual storage device corresponding to a physical storage device that is located on the client device, wherein the physical storage device is accessed by communicating universal serial bus (USB) request blocks;

receiving, from an application on the remote device, a storage input/output (I/O) request at a file system level of a stack for accessing the physical storage device, wherein the stack comprises the file system level, a volume level, a disk level, a small computer system interface (SCSI) level and a universal serial bus (USB) level;

converting, on the remote device, the storage I/O request at the file system level of the stack to a block-level request at the volume level of the stack;

providing the block-level request to a driver of the virtual storage device;

redirecting, by the driver on the remote device, the block-level request at the volume level of the stack to an agent on the remote device;

sending, by the agent on the remote device, the block-level request to the client device, wherein, on the client device, the block-level request is converted into a USB request block of the USB level of the stack used to access the physical storage device;

receiving, by the remote device, a result of the block-level request from the client device at the volume level of the stack; and providing, by the driver on the remote device, to the application, a response to the storage I/O request based on the result.

2. The method of claim 1, further comprising receiving, by the remote device, a request from the client device to initiate creation of the virtual storage device based on the physical storage device.

3. The method of claim 1, further comprising creating a virtual channel between the remote device and the client device, wherein the block-level request and the result of the block-level request are transmitted via the virtual channel.

4. The method of claim 1, wherein the physical storage device is a universal serial bus (USB) device connected to the client device.

5. The method of claim 1, wherein the result of the block-level request comprises data retrieved from the physical storage device based on the block-level request, and wherein the data is transmitted from the client device to the remote device in a single transmission.

6. The method of claim 1, further comprising creating, on the remote device, an additional virtual volume, wherein an initial virtual volume associated with creating the virtual storage device corresponds to a first partition of the physical storage device and the additional virtual volume corresponds to a second partition of the physical storage device.

7. The method of claim 1, further comprising:
determining, by the agent, that completing the storage I/O request requires multiple block-level requests including the block-level request and a second block-level request at the volume level of the stack;
batching, by the agent, the block-level request and the second block-level request into a single message for transmission from the remote device to the client device.

8. A system for storage device input/output (I/O) performance improvement in a remote computing environment, comprising:
at least one memory; and
at least one processor coupled to the at least one memory, the at least one processor and the at least one memory configured to:
create, on a remote device that is remote from a client device, a virtual storage device corresponding to a physical storage device that is located on the client device, wherein the physical storage device is accessed by communicating universal serial bus (USB) request blocks;
receive, from an application on the remote device, a storage input/output (I/O) request at a file system level of a stack for accessing the physical storage device, wherein the stack comprises the file system level, a volume level, a disk level, a small computer system interface (SCSI) level and a universal serial bus (USB) level;
convert, on the remote device, the storage I/O request at the file system level of the stack to a block-level request at the volume level of the stack;
provide the block-level request to a driver of the virtual storage device;
redirect, by the driver on the remote device, the block-level request at the volume level of the stack to an agent on the remote device;
send, by the agent on the remote device, the block-level request to the client device, wherein, on the client device, the block-level request is converted into a USB request block of the USB level of the stack used to access the physical storage device;
receive, by the remote device, a result of the block-level request from the client device at the volume level of the stack; and
provide, by the driver on the remote device, to the application, a response to the storage I/O request based on the result of the block-level request.

9. The system of claim 8, wherein the at least one processor and the at least one memory are further configured to receive, by the remote device, a request from the client device to initiate creation of the virtual storage device based on the physical storage device.

10. The system of claim 8, wherein the at least one processor and the at least one memory are further configured to create a virtual channel between the remote device and the client device, wherein the block-level request and the result of the block-level request are transmitted via the virtual channel.

11. The system of claim 8, wherein the physical storage device is a universal serial bus (USB) device connected to the client device.

12. The system of claim 8, wherein the result of the input block-level request comprises data retrieved from the physical storage device based on the block-level request, and wherein the data is transmitted from the client device to the remote device in a single transmission.

13. The system of claim 8, further comprising creating, on the remote device, an additional virtual volume, wherein an initial virtual volume associated with creating the virtual storage device corresponds to a first partition of the physical storage device and the additional virtual volume corresponds to a second partition of the physical storage device.

14. The system of claim 8, wherein the at least one processor and the at least one memory are further configured to:
determine, by the agent, that completing the storage I/O request requires multiple block-level requests including the block-level request and a second block-level request at the volume level of the stack;
batch, by the agent, the block-level request and the second block-level request into a single message for transmission from the remote device to the client device.

15. A non-transitory computer-readable medium storing instructions that, when executed by one or more processors, cause the one or more processors to:

create, on a remote device that is remote from a client device, a virtual storage device corresponding to a physical storage device that is located on the client device, wherein the physical storage device is accessed by communicating universal serial bus (USB) request blocks;

receive, from an application on the remote device, a storage input/output (I/O) request at a file system level of a stack for accessing the physical storage device, wherein the stack comprises the file system level, a volume level, a disk level, a small computer system interface (SCSI) level and a universal serial bus (USB) level;

convert, on the remote device, the storage I/O request at the file system level of the stack to a block-level request at the volume level of the stack;

provide the block-level request to a driver of the virtual storage device;

redirect, by the driver on the remote device, the block-level request at the volume level of the stack to an agent on the remote device;

send, by the agent on the remote device, the block-level request to the client device, wherein, on the client device, the block-level request is converted into a USB request block of the USB level of the stack used to access the physical storage device;

receive, by the remote device, a result of the block-level request from the client device at the volume level of the stack; and provide, by the driver on the remote device, to the application, a response to the storage I/O request based on the result of the block-level request.

16. The non-transitory computer-readable medium of claim 15, wherein the instructions, when executed by the one or more processors, further cause the one or more processors to receive, by the remote device, a request from the client device to initiate creation of the virtual storage device based on the physical storage device.

17. The non-transitory computer-readable medium of claim 15, wherein the instructions, when executed by the one or more processors, further cause the one or more processors to create a virtual channel between the remote device and the client device, wherein the block-level request and the result of the block-level request are transmitted via the virtual channel.

18. The non-transitory computer-readable medium of claim 15, wherein the physical storage device is a universal serial bus (USB) device connected to the client device.

19. The non-transitory computer-readable medium of claim 15, wherein the instructions, when executed by the one or more processors, further cause the one or more processors to create, on the remote device, an additional virtual volume, wherein
an initial virtual volume associated with creating the virtual storage device corresponds to a first partition of the physical storage device and the additional virtual volume corresponds to a second partition of the physical storage device, and
the result of the input or output operation comprises data retrieved from the physical storage device based on the block-level request, and wherein the data is transmitted from the client device to the remote device in a single transmission.

20. The non-transitory computer-readable medium of claim 15, wherein the instructions, when executed by the one or more processors, further cause the one or more processors to:
determine, by the agent, that completing the storage I/O request requires multiple block-level requests including the block-level request and a second block-level request at the volume level of the stack;
batch, by the agent, the block-level request and the second block-level request into a single message for transmission from the remote device to the client device.

* * * * *